United States Patent
Khanduri et al.

(10) Patent No.: US 10,356,587 B2
(45) Date of Patent: Jul. 16, 2019

(54) WEARABLE DEVICE AS SERVICE ENABLER

(71) Applicant: Verizon Patent and Licensing Inc., Arlington, VA (US)

(72) Inventors: Prakash C. Khanduri, Freehold, NJ (US); Anwarul Hannan, Basking Ridge, NJ (US); Baris Yildiz, Basking Ridge, NJ (US); Charles Lane, Lucas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 66 days.

(21) Appl. No.: 15/371,094

(22) Filed: Dec. 6, 2016

(65) Prior Publication Data

US 2018/0160256 A1 Jun. 7, 2018

(51) Int. Cl.
| | |
|---|---|
| *H04W 4/02* | (2018.01) |
| *H04W 4/80* | (2018.01) |
| *H04W 8/00* | (2009.01) |
| *H04W 76/14* | (2018.01) |

(52) U.S. Cl.
CPC ............ *H04W 4/80* (2018.02); *H04W 4/02* (2013.01); *H04W 8/005* (2013.01); *H04W 76/14* (2018.02)

(58) Field of Classification Search
CPC ..... H04W 4/008; H04W 4/16; H04W 76/023; H04W 4/06; H04W 84/12; H04W 12/06; H04W 24/04; H04W 36/0016; H04W 36/365; H04W 40/02; H04W 52/0251; H04W 60/00; H04W 68/005; H04W 76/02; H04W 76/027; H04M 1/7253; H04M 1/6066; H04M 1/2535; H04M 1/6058; H04M 2250/02; H04M 2250/62; H04M 3/42263; H04M 3/54; H04M 2203/5018; H04M 3/465; H04M 3/58
See application file for complete search history.

(56) References Cited

U.S. PATENT DOCUMENTS

| | | | | |
|---|---|---|---|---|
| 9,392,523 | B1* | 7/2016 | Arestani | H04W 40/02 |
| 9,584,518 | B1* | 2/2017 | Robertson | H04L 63/105 |
| 2008/0056472 | A1* | 3/2008 | Tanemura | H04M 3/42374 |
| | | | | 379/201.01 |
| 2008/0146151 | A1* | 6/2008 | Lyu | H04B 17/27 |
| | | | | 455/41.2 |
| 2013/0310049 | A1* | 11/2013 | Siegel | H04M 1/6066 |
| | | | | 455/445 |
| 2014/0134986 | A1* | 5/2014 | Yasumoto | H04B 1/3816 |
| | | | | 455/414.1 |
| 2014/0308939 | A1* | 10/2014 | Goldman | H04M 1/2535 |
| | | | | 455/417 |

(Continued)

*Primary Examiner* — Golam Sorowar

(57) ABSTRACT

A wearable device, such as a smartwatch, may be used to enable switching of network services between endpoints. The switching of network services may include transferring the telephone number associated with a user's account to a particular active device, selected from a number of possible devices, of the user. The switching may be based on a number of factors and coordinated through the wearable device. The factors may include, for example, the location of the user, the location of the user relative to the user's endpoints, user provided priority information, and/or other user-specified profile information relating to endpoint preferences.

20 Claims, 10 Drawing Sheets

(56) References Cited

U.S. PATENT DOCUMENTS

| | | | |
|---|---|---|---|
| 2015/0350857 A1* | 12/2015 | Lim | H04M 3/54 455/41.2 |
| 2016/0036476 A1* | 2/2016 | Cho | H04W 8/26 455/558 |
| 2016/0278143 A1* | 9/2016 | Akhtar Masoom Akhtar | H04W 76/14 |
| 2016/0316414 A1* | 10/2016 | Yeoum | H04L 65/1016 |

* cited by examiner

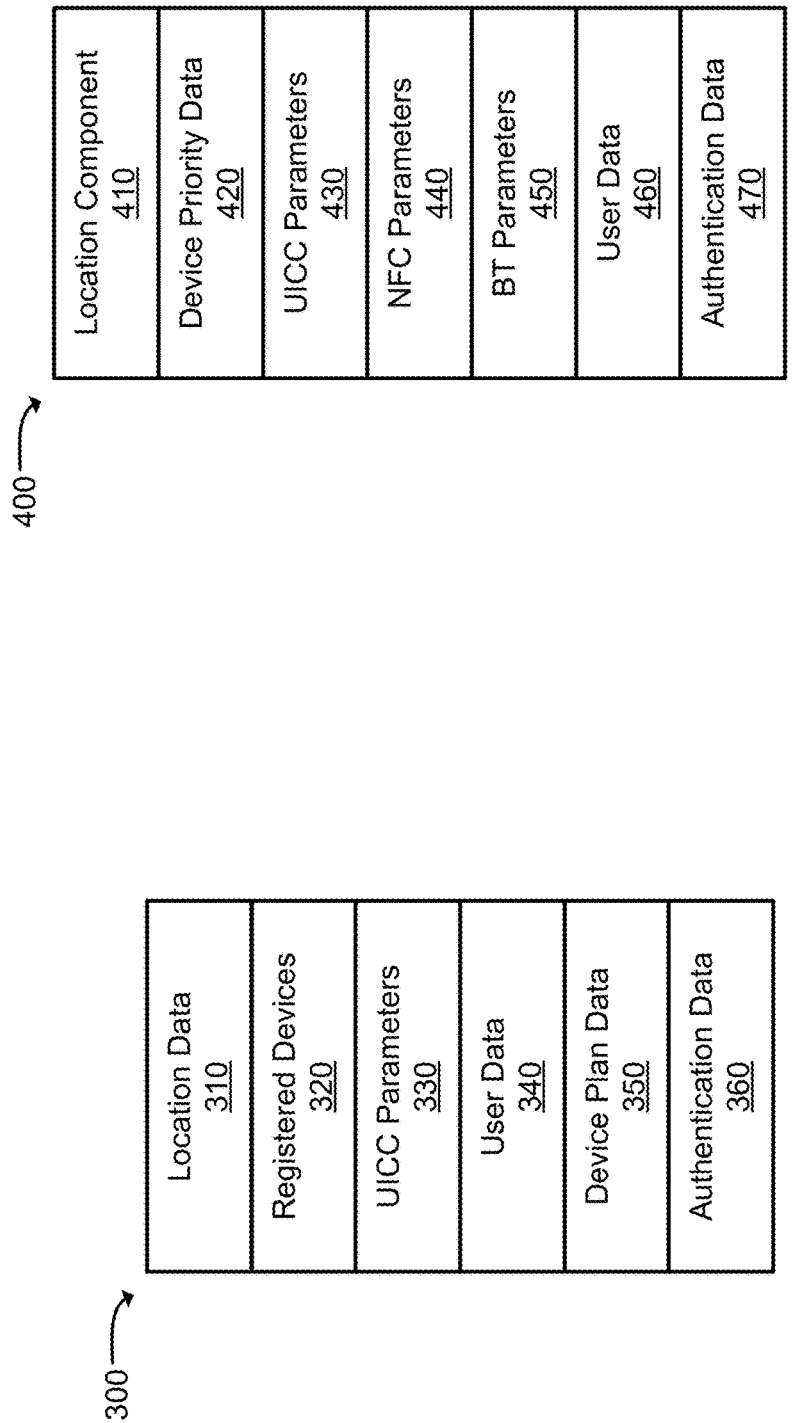

WEARABLE DEVICE AS SERVICE ENABLER

BACKGROUND

One trend in wireless communications systems is for users to own multiple endpoints. For example, a user may own a portable smartphone, a desktop phone, a home phone, a tablet device, and an automobile that includes an embedded cellular communication system. All of the endpoints may be capable of communicating with a wireless network. For example, all the endpoints may be assigned a separate telephone number via which telephone calls and other network services can be provided.

Managing separate numbers for each endpoint can be burdensome to the user and for the network operator. One technique to alleviate this problem is to associate a single number with multiple endpoints. In this situation, a call to an endpoint may simultaneously be received at each of the endpoints.

Another technique to alleviate the above-mentioned problem is to allow the same number to be selectively shared among the multiple endpoints. For example, at any one time, only one endpoint may be associated with the user's number, and the user may selectively choose which endpoint is the currently active endpoint (e.g., through an online account administration tool).

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIG. 3 is a diagram illustrating example functional components of the service transfer component shown in FIG. 2;

FIG. 4 is a diagram illustrating example functional components and/or data structures, relating to switching communication devices;

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

As described herein, network services, such as network services (e.g., calls) associated with a mobile device, may be selectively shared among multiple endpoints of a user. The term "network services," as used herein, may generally refer to services associated with a particular user or mobile directory number (MDN) (e.g., telephone number). Network services may include voice calls, video calls, messaging services, and/or other communication services that may be enabled for a user at an endpoint. The network services may be seamlessly switched between the endpoints, with the assistance of another user device, such as a wearable device (e.g., a smartwatch). Selective switching may be based on a number of factors and coordinated through the wearable device. The factors may include, for example, the location of the user, the user's endpoints, the location of the user relative to the user's endpoints, and/or user-specified profile information relating to endpoint preferences.

"Switching" of network services, as used herein, may refer to the transferring of network services between different endpoints associated with a user. From the user's perspective, the switching may involve, for example, transferring the active telephone number between endpoints. Alternatively or additionally, other network services may be transferred. In one implementation, switching of services may include copying a user's Subscriber Identity Module (SIM) profile from one a first endpoint to second endpoint, activating network services associated with the SIM profile at the second endpoint, and deactivating services associated with SIM profile at the first endpoint.

Figure 1A:
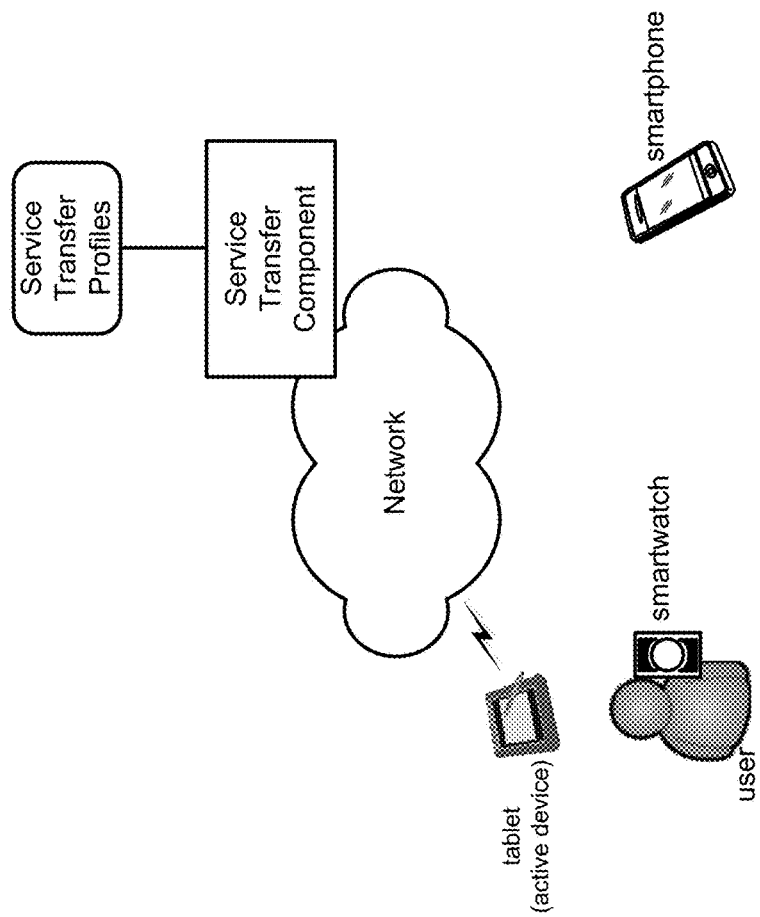
FIGS. 1A and 1B are diagrams illustrating an example overview of one or more implementations described herein.
Figure 1B:
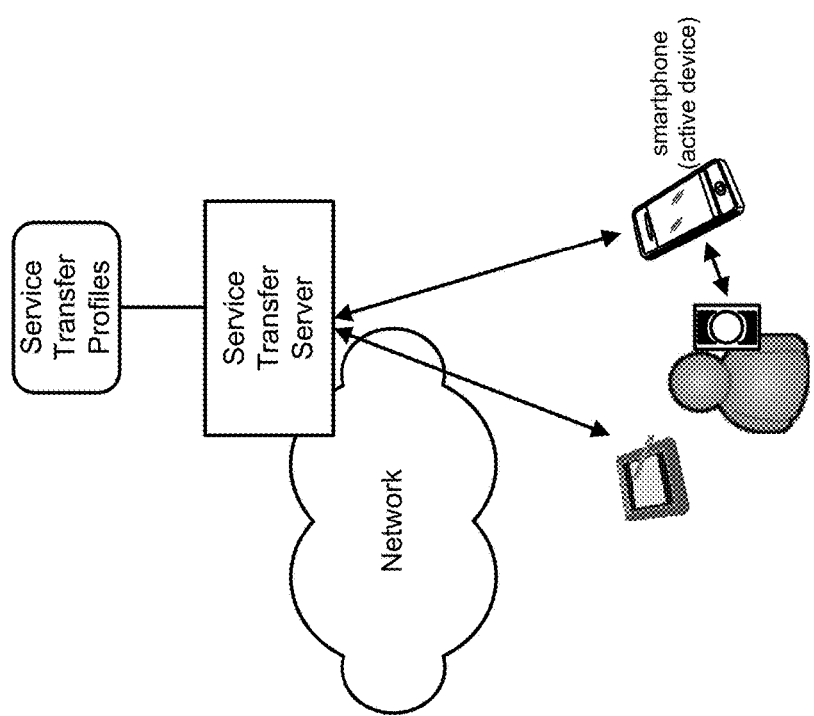

FIGS. 1A and 1B are diagrams illustrating an example overview of one or more implementations described herein. As shown, assume that a user possesses a number of endpoints, including a tablet device, a smartwatch or other wearable device, and a smartphone. Consistent with aspects described herein, the smartwatch may enable potentially seamless switching of the active network service between the tablet and the smartphone.

As is further shown in FIG. 1A, the mobile communication network may include or be associated with a service transfer component, which may be a server or logical process that controls the selective switching of the network services. The service transfer component may store a service transfer profile for the user. The service transfer profile may indicate, for example, the endpoints associated with the user's account, the user's preferred endpoint priority, and/or other rules or policies describing when or how an endpoint associated with the user's account is to be made the active endpoint.

In FIG. 1A, the tablet may be the active endpoint. For example, the user may be carrying or otherwise be in close proximity to the tablet. Because the tablet is the active endpoint in this example, the tablet may be assigned the user's telephone number, such that incoming calls for the user are routed, by the network, to the tablet. The fact that the user is in close proximity of the smartphone may be determined using a number of techniques. For example, the smartwatch may detect the smartphone based on the presence of a short range communication protocol such as a Bluetooth connection to the smartphone. In one implementation, when the receive signal strength of the Bluetooth connection with the smartphone is greater than a threshold value, the smartwatch may determine that the smartphone is in close proximity to the user.

Referring to FIG. 1B, assume that the user moves within close proximity of the user's smartphone (e.g., within a predetermined distance of the smartphone). Additionally, assume that the user's profile indicates that the smartphone has higher priority over the tablet. Thus, when both the tablet and the smartphone are in close proximity to the user, the user may preferentially prefer that the smartphone be made the active endpoint for the user.

Based on the above-mentioned factors, and potentially based on other factors, the smartwatch may initiate a switch of network services from the tablet to the smartphone. The smartwatch may, either through direct communication with the mobile communication network or via communication with the mobile communication network that is routed through the tablet, contact the service transfer component to indicate that a switch is desired. The smartwatch may additionally communicate with the smartphone, such as through the established Bluetooth connection, to indicate that the smartphone is to become the active endpoint for the user. In some implementations, the service transfer component may communicate with the tablet to rescind the active status of the tablet and may communicate with the smartphone to enable the smartphone as the active endpoint for the user.

In some implementations, the transfer of the network services may be completely seamless from the standpoint of the user. For instance, the transfer may happen without explicitly notifying the user. In other implementations, the user may be notified of the switch, such as via a notification on the smartwatch. Still further, in other implementations, the switching of the endpoint may only be performed after explicit confirmation from the user, such as via confirmation made through the smartwatch. In this manner, network services may be provided to a user, based on user endpoint that is most preferred by the user, in a manner that seamlessly switches between the user endpoints.

Figure 2:
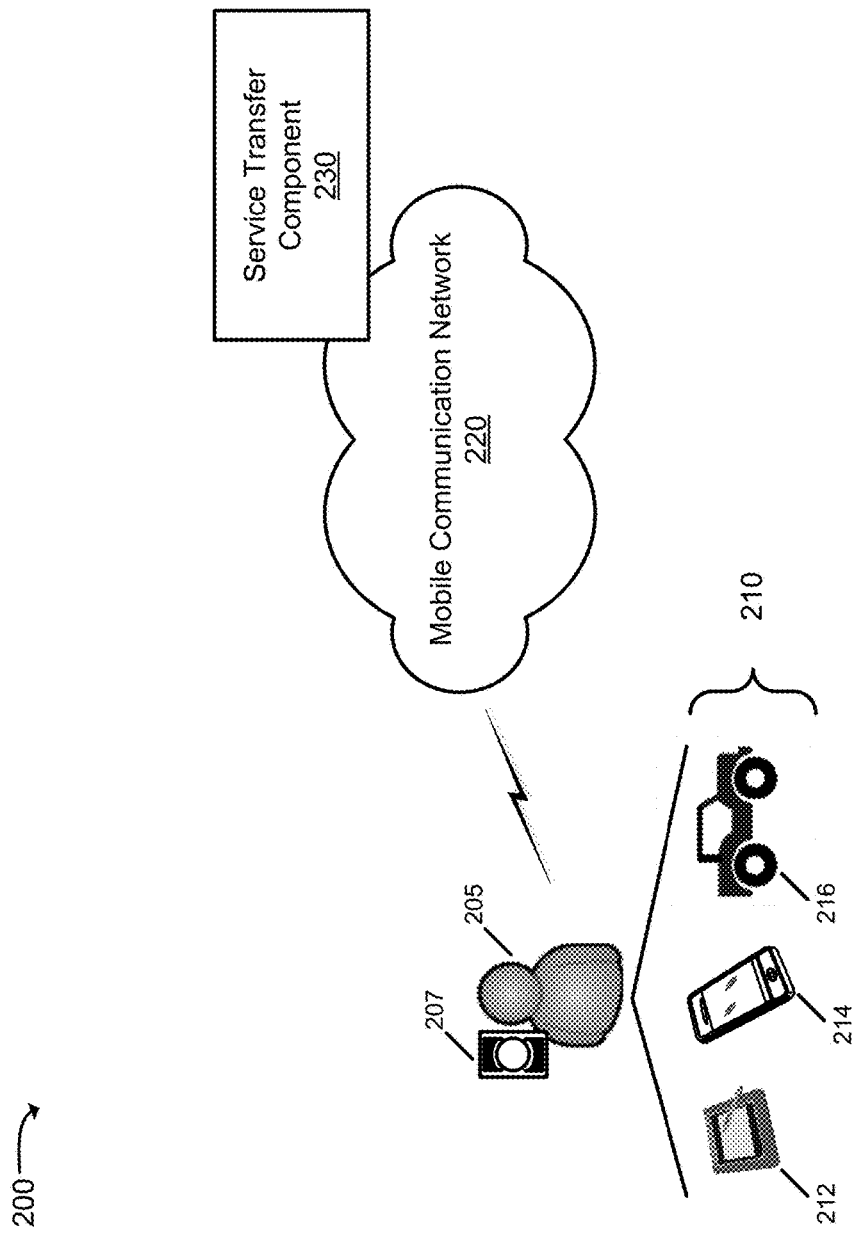
FIG. 2 illustrates an example environment in which systems and/or methods described herein may be implemented.

FIG. 2 illustrates an example environment 200 in which systems and/or methods described herein may be implemented. As shown in FIG. 2, environment 200 may include a user 205 that is associated with a number of endpoints, including a wearable device 207 and a number of communication devices 210 that are designed to communicate with mobile communication network 220. An example set of the other communication devices 210, as shown in FIG. 2, includes a tablet device 212, smartphone 214, and a communication system integrated within a vehicle 216.

Wearable device 207 may include a smartwatch or other wearable device that may generally be carried by user 205 (e.g., a fitness band, a necklace, glasses, an eyeglass, a ring, a belt, a headset, or another type of wearable communications device). Wearable device 207 may include a process designed to coordinate the switching of network services between different communication devices 210. Wearable device 207 may include radio circuitry for implementing short range wireless connections, such as a Bluetooth connection and/or a Near Field Communication (NFC) connection, with communication devices 210 that are within range of wearable device 207. In some implementations, other types of short range wireless communication logic may alternatively or additionally be implemented by wearable device 207, such as Wi-Fi connectivity, WiFi Direct connectivity, ZigBee connectivity, and/or Bluetooth Low Energy (BLE) connectivity. Wearable device 207 may be configured to automatically pair with communication devices 210, via a Bluetooth session, whenever these communication devices come within range of wearable device 207. In some implementations, wearable device 207 may include a cellular radio and be designed to connect with mobile communication network 220.

In some implementations, wearable device 207 may include logic to determine the location of wearable device 207 (and hence the location of user 205). For example, wearable device 207 may include a Global Positioning System (GPS) component to obtain the geographic location of user 205. Alternatively or additionally, wearable device 207 may use other techniques to determine the location of user 205. For example, wearable device 270 may include circuitry for Wi-Fi and/or cellular network connectivity and may obtain the location of wearable device 207 based on communications with a corresponding access point or base station. In some implementations, the location of wearable device 207 may be determined relative to a location of one or more of communication devices 210. For example, based on the signal strength (e.g., the Bluetooth signal strength) of the short range sessions (or based on connectionless signals, such as Bluetooth beacon signals) with the communication devices 210, wearable device 207 may be able to estimate the distance between wearable device 207 and the corresponding communication device 210. In some situations, the fact that wearable device 207 is able to connect, via a short range wireless connection, with one of communication devices 210, may be used as an indication of the relative location of wearable device 207 and one of communication devices 210.

Communication devices 210 may include any computation and communication device that is capable of communicating with one or more networks (e.g., mobile communication network 220). For example, each communication device 210 may include a radiotelephone, a personal communications system (PCS) terminal (e.g., a device that combines a cellular radiotelephone with data processing and data communications capabilities), a personal digital assistant (PDA) (e.g., a device that includes a radiotelephone, a pager, etc.), a laptop computer, a tablet computer, a camera, a television, a set-top device ("STD), a personal gaming system, a communication device embedded within a vehicle, a wearable device, and/or another type of computation and communication device.

Mobile communications network 220 may include one or more network devices used to provide cellular wireless communication services to users. Typically, the coverage area of mobile communications network 220 may be relatively large. Mobile network 220 may provide wireless network service to one or more endpoints. Mobile communications network 220 may include a network based on the Long Term Evolution (LTE) standard and may include a radio access network (RAN) portion and a core portion. In other implementations, mobile communication network 220 may be based on standards other than LTE, such as LTE+, LTE-Advanced, WiMax, WiFi, or other standards. In the context of an LTE network, endpoints that can connect with mobile communication network (e.g., communication devices 210 and/or wearable device 207) may be referred to as User Equipment (UE). The terms "UE" and "endpoint" may be used interchangeably herein. The RAN may provide the wireless (e.g., radio) interface to the UEs and may include one or more base stations, which, in the context of an LTE network, may be referred to as Evolved NodeBs (eNBs). The core portion may include a number of network devices, such as a Packet Data Network Gateway (PGW), a Serving Gateway (SGW), and a Mobility Management Entity (MME).

As described herein, mobile communication network 220 may include or be associated with service transfer component 230. Service transfer component 230 may include a server, a plurality of geographically distributed servers, and/or logical processes to enable selective transfer of network services (e.g., transfer of the telephone number) between different communication devices 210. Service transfer component 230 may, for example, communicate and/or control one or more other network devices, such as an MME or SGW, associated with mobile communication network 220, to enable the transfer of the network services to the selected communication device. At any particular time, one of communication devices 210 may be the "active" communication device. The active communication device may receive telephone calls and other communications (e.g., text messages, video calls, etc.) intended for user 205.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environment 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200. Also, while "direct" connections are shown in FIG. 2 between certain devices, some devices may communicate with each other via other networks or links.

FIG. 3 is a diagram illustrating example functional components/data structures 300 of service transfer component 230. Each functional component 300 may include processing logic and/or a data structure(s) relating to the operation of service transfer component 230. As shown, functional components 300 may include location data 310, registered devices 320, UICC parameters 330, user data 340, device plan data 350, and authentication data 360.

Location data 310 may include location parameters for communication devices 210. The location parameters may be customized for each communication device 210 by the user that owns the communication device 210. The location parameters may indicate location-based restrictions on when a communication device is to be made an active communication device. In some implementations, the location parameters may indicate particular geographical regions (e.g., regions specified via latitude/longitude or device) or places (e.g., the user's home, work, school, or another place). In one implementation, for each communication device 210, location data 310 may indicate one or more locations at which the communication device is eligible to potentially be set as an active communication device. Alternatively or additionally, location data 310 may include location parameters that are specified as a distance relative to the user or to wearable device 207.

Registered devices 320 may include an indication of each communication device 210 and the corresponding user account with which the communication device is associated. Communication devices 210 may be identified by, for example, a unique device serial number, media access control (MAC) value, Mobile Subscription Identity Number (MSIN) value, International Mobile Station Equipment Identity (IMEI), or other value.

UICC parameters 330 may store Universal Integrated Circuit Card (UICC) parameters that may need to be updated at each communication device that becomes the active communication device. The UICC, for a communication device 210, may be a smart card that contains basic logic needed for a communication device 210 to operate with various types of wireless telecommunications networks. Switching a communication device to become an active communication device may involve updating the UICC parameters at the active communication device to match the UICC parameters of the previously active communication device. UICC parameters 330 may include, for example, parameters that are to be stored on user SIM cards.

User data 340 may include additional user data that is to be synchronized when switching communication devices. User data 340 may include, for example, call history information, the contact list for a user, user calendar data, and/or other user specific data. Device plan data 350 may include information relating to the network features that are subscribed to by a particular user or account. Device plan data 350 may include, for example, an indication of the bandwidth limits, latency guarantees, or other plan-specific information, which may be specified on a per-account or per-communication device basis.

Authentication data 360 may store information used in the authentication of communication devices 210. In one implementation, public-key cryptography may be used to authenticate communication devices 210. Alternatively or additionally, other authentication techniques could be used, such as authentication based-on a shared secret. In this implementation, each communication device 210 may be associated with a public-private key pair. Authentication data 360 may include the corresponding public key of each communication device 210. During the authentication process, the communication device may sign a message with the corresponding private key, and service transfer component 230 may authenticate the communication device using the corresponding public key associated with the communication device. A similar authentication process may be performed, at wearable device 207, to authenticate a communication device.

FIG. 4 is a diagram illustrating example functional components and/or data structures 400, relating to switching communication devices, that may be implemented at a client device, such as wearable device 207 and/or communication devices 210. As shown, functional component 400 may include location component 410, device priority data 420, UICC parameters 430, NFC parameters 440, Bluetooth (BT) parameters 450, user data 460, and authentication data 470.

Location component 410 may obtain and store location information, such as the current position of the device (e.g., as either an absolute coordinate value or relative to other devices). Location component 410 may alternatively or additionally store location parameters, similar to the location parameters used by service transfer component 230, that indicate when a communication device can potentially be switched to become the active communication device. In some implementations, location component 410 may include logic, such as GPS circuitry (or using other techniques, such as the location of a base station to which the community device is connected), to obtain the location of the device. Alternatively or additionally, other techniques may be used to obtain the relative position of the communication device, such as the signal strength received from another communication device or from wearable device 207.

Device priority data 420 may include an indication of the relative priority of the communication device for purposes of switching to the communication device. For example, for a user that has three registered communication devices, including a tablet, a smartphone, and a communication device embedded within a vehicle, the device priorities, assigned by the user, may indicate that the user prefers to use the communication device of the vehicle when the user is in the vehicle. If the user is not in the vehicle, the user may prefer to use the tablet over the smartphone, but only when the tablet is within a certain distance of the user. Otherwise, the user may prefer to use the smartphone.

UICC parameters 430 may store the UICC parameters associated with the communication device. UICC parameters 430 may particularly include UICC parameters that are to be updated at the active communication device. In one implementation, the UICC parameters may be synchronized with the UICC parameters stored by service transfer component 230. In this manner, when the active communication device is switched, the current state of the UICC parameters may be used at the active communication device.

NFC parameters 440 and Bluetooth parameters 450 may include parameters relating to short range wireless sessions that are established by communication device 440, such as parameters relating to NFC and Bluetooth sessions, respectively. The parameters may include, for example, security-related parameters or other parameters relating to the formation and/or implementation of the short range wireless sessions.

User data 470 may include additional user data that is to be synchronized with the active communication device. User data 470 may be similar to user data 340, and may include, for example, call history information, the contact list for a user, user calendar data, and/or other user specific data.

Authentication data 470 may store information, such as a private key that is assigned or generated by the computing device, used in the authentication of the communication device. For example, each communication device 210 may be assigned a private key that may be used, during authentication of the computing device with a network and/or with wearable device 207. Authentication data 470 may also include the public keys of other endpoints.

Figure 5:
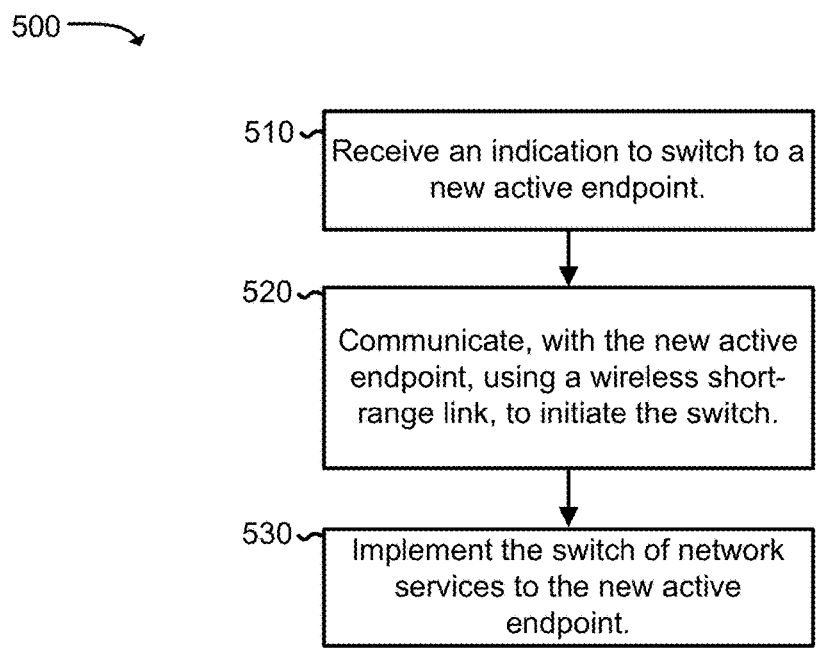
FIGS. 5-7 are flowcharts of example processes for switching the active endpoint.

FIG. 5 is a flowchart of an example process 500 for switching the active endpoint. Process 500 may be a manual approach in which the user initiates a switch via a user interface presented by wearable device 207. Process 500 may be performed by, for example, wearable device 207 (e.g., a smartwatch).

Process 500 may include receiving an indication to switch the active endpoint (block 510). For example, wearable device 207 may include a "switch active device" application. The application may include a number of icons, each corresponding to a different endpoint. To switch the endpoint, the user may select the icon corresponding to the endpoint that the user desires to be the active endpoint. In some implementations, wearable device 207 may be a potentially endpoint (e.g., when wearable device includes a mobile radio).

Process 500 may further include communicating, with the selected new endpoint, using a wireless short-range link (block 520). For example, wearable device 207 may communicate with the selected communication device via a Bluetooth link or Wi-Fi link. Via the short range link, wearable device 207 may initiate the switching to the selected endpoint (block 520). For example, wearable device 270 may authenticate the selected endpoint (e.g., based on private-key authentication techniques and/or exchange other parameters relating to switching of the active endpoint.

Process 500 may further include implementing the switch of network services (e.g., the telephone number) to the new active endpoint (block 530). For example, wearable device 207 may instruct the selected endpoint to begin the switch to becoming the active endpoint. In response, the selected endpoint may initiate its cellular radio (e.g., power-up or exit sleep or idle mode), attach to the mobile communication network 220, and/or request (such as via communications with service transfer component 230) that it is made the active endpoint for the user. Service transfer component 230 may configure the network, and potentially the previous active endpoint, to implement the service handover to the selected endpoint. As a result of the service handover, network services, for the user, may be routed to the selected endpoint instead of the previously selected endpoint. Wearable device may cause a cessation of the routing of the network services to the previously selected endpoint. In some implementations, the particular network services that are enabled may be specific to the endpoint. For example, a smartphone have a different set of network services than a deskphone.

In some implementations, it may be desirable for the active endpoint to only remain as the active endpoint as long as it is in the vicinity of the user. This may be a particularly useful feature when wearable device 207 can also function as an endpoint with mobile communication network 220 (i.e., wearable device 207 is a UE in mobile communication network 220). In this situation, wearable device 207 may monitor the proximity of the active endpoint to the user, such as by monitoring the signal quality or strength of the Bluetooth connection between wearable device 207 and the active endpoint. When the active endpoint is determined to no longer be in proximity to wearable device 207, wearable device 207 may automatically initiate, with service transfer component 230, switching of the active communication device to wearable device 207.

Figure 6:
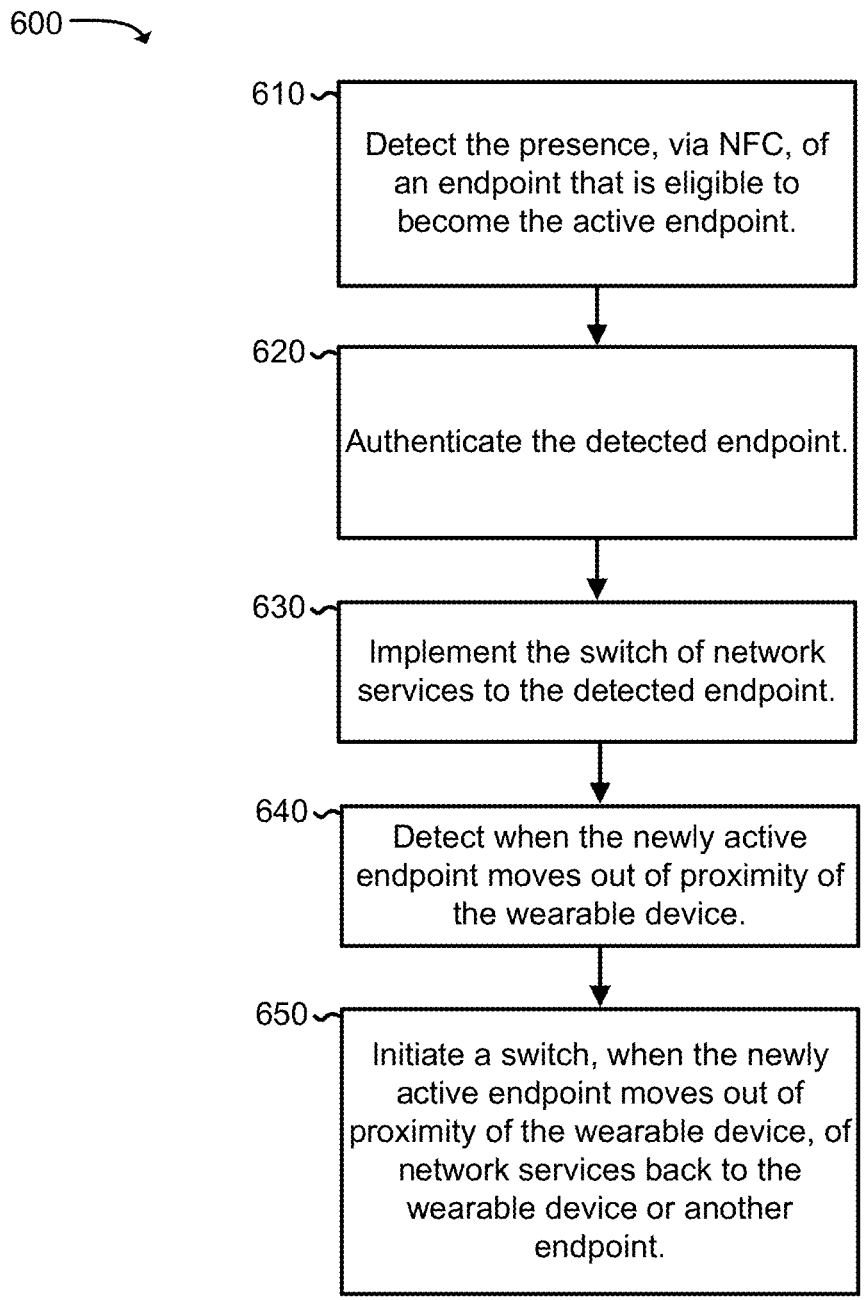

FIG. 6 is a flowchart of an example process 600 for switching the active endpoint. Process 600 may be a semi-autonomous switch to the active endpoint. Process 600 may be performed by, for example, wearable device 207 (e.g., a smartwatch). Process 600 may generally be based on initiating the switch to a communication device being detected as being very close to the wearable device, as detected via NFC. When the active endpoint moves out of proximity of the wearable device, wearable device 307 may switch the active communication device back to wearable device 207 or to another communication device. Process 600 is considered semi-autonomous in the sense that the user can simply "touch" (e.g., as detected via an NFC connection) the communication device to the wearable device to initiate the switch and does not need to navigate through a graphical user interface of wearable device 207.

As shown in FIG. 6, process 600 may include detecting the presence, via NFC, of an eligible endpoint (block 610). In one implementation, NFC may be used to detect the presence of the endpoint when the endpoint is within 10 cm or less of the wearable device. This may typically correspond to a user tapping the wearable device with the endpoint or waving the endpoint near the wearable device.

In some implementations, whether to switch endpoints based on the detected presence of an eligible endpoint (as performed in block 610), may be further based on the user preference information. For example, the user preference information may indicate that the user's smartphone is only to be made the active endpoint when the user is not near the user's deskphone. In this situation, a "touch" by the user of the smartphone to the wearable device may be an inadvertent touch, and the active endpoint may thus be maintained at the deskphone. In some implementations, in order to further avoid the possibility of an inadvertent touch, the user's smartphone may notify the user (e.g., via vibration) before initiating an endpoint switch, thus giving the user a chance to cancel the switch.

Process 600 may further include authenticating the endpoint (block 620). In one implementation, the authentication may be performed via NFC. Alternatively or additionally, another communication link, such as a Bluetooth link with the endpoint, may be used to perform authentication (e.g., such as based on private key authentication).

Process 600 may further include implementing the switch to the endpoint (block 630). Switching to the detected endpoint as the active endpoint may be performed similarly to the switch described above with respect to block 530 (FIG. 5).

Wearable device 207 and the active endpoint may maintain a short-range wireless link (e.g., Bluetooth, Bluetooth LE, etc.). Process 600 may further include detecting that the endpoint moves out of proximity of the wearable device (block 640). In one implementation, "out of proximity" may be detected when the signal strength of the short-range link falls below a threshold value. Alternatively, the movement of the active endpoint beyond a threshold distance from wearable device 207 may be detected using other techniques, such as GPS based location techniques.

Process 600 may further include, when the endpoint moves out of proximity of the wearable device, initiating a switch back to the wearable device or another endpoint as the active endpoint (block 650). For example, wearable device 207 and/or the active endpoint and may communicate, with service transfer component 230, to switch the active endpoint to wearable device 207 (or to another endpoint that is within proximity of wearable device 207).

Figure 7:
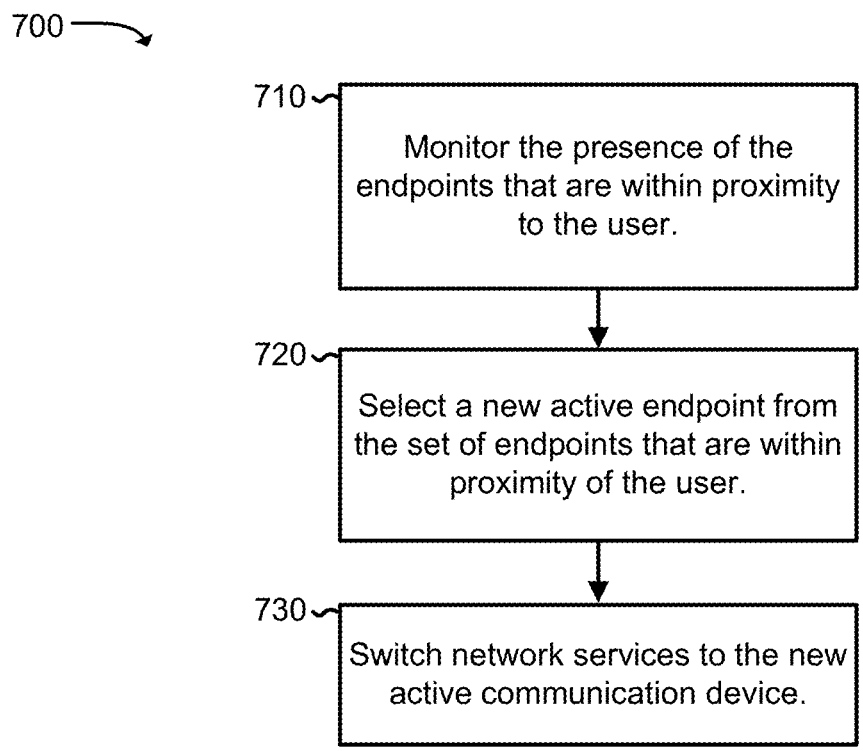

FIG. 7 is a flowchart of another example process 700 for switching the active endpoint. Process 700 may implement a seamless service switch (e.g., performed automatically and without an explicit command from the user) to the active endpoint. Process 700 may be performed by, for example, wearable device 207.

Process 700 may include monitoring the presence of the endpoints that are within proximity of the user (block 710). In one implementation, an endpoint may be considered to be within "proximity of the user" when wearable device 207 establish an active Bluetooth link with the communication device. In other implementations, the signal strength of the Bluetooth link or signal between wearable device 207 and communication devices 210 may be used to determine whether a particular endpoint is in proximity of the user. For example, wearable device 207 may consider a particular endpoint to be in proximity of the user when the Bluetooth signal strength with the particular endpoint is above a predetermined threshold. In this manner, wearable device 207 may maintain a list of a set of endpoints that may potentially be set to be the active endpoint.

Process 700 may further include selecting the active endpoint from the set of endpoints that are within proximity of the user (block 720). In one implementation, wearable device 207 may make the selection based on a number of factors. The factors may include, for example, a predefined priority value or ranking for each of the endpoints, the location of wearable device 207, the time of day, the Bluetooth signal strength of the communication devices, and/or other factors. The priority values or the values for the other factors may be configured by the user, such as during an initial setup or provisioning of the communication devices or the wearable device.

Process 700 may further include switching the network services to the new active endpoint (block 730). The switching of the network services may be performed similarly to the switch performed, as described above, with respect to block 530 or 650.

Figure 8:
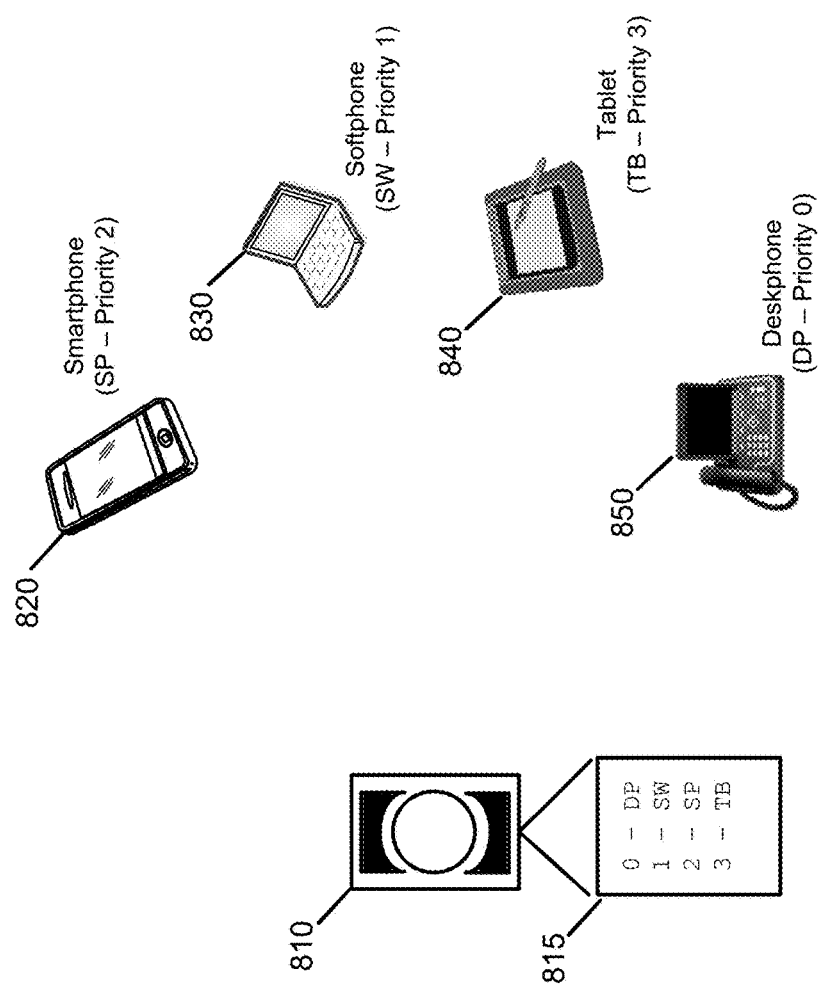
FIG. 8 is a diagram illustrating an example system of endpoints, including a wearable device.

FIG. 8 is a diagram illustrating an example system of endpoints, including a wearable device. Examples of the operation of process 700 will be described with reference to FIG. 8. In FIG. 8, assume that a user possesses a wearable device 810 (e.g., a smartwatch) and a number of computing devices that the user has configured as the set of computing devices out of which the user would like to selectively choose an active endpoint. The potential set of computing devices includes smartphone 820, softphone 830 (e.g., a laptop or other general purpose computer running a telephone application), tablet 840, and deskphone 850. Additionally, assume that the user has assigned relative priority values to each of the computing devices. As shown, the priority values are: deskphone 850 (priority zero), softphone 830 (priority one), smartphone 820 (priority two), and tablet 840 (priority three). In this example, the lower values indicate higher priority (i.e., deskphone 850 has the highest priority among the user's communication devices). Wearable device 810 may maintain a table 815 includes a listing of the computing devices and the assigned priorities of the devices.

In operation, wearable device 810 may update table 815 to reflect the communication devices 820-850 that are within wireless short-range communication of wearable device 810. For example, wearable device 810 may pair, via a Bluetooth link, when each of devices 820-850 are within range of the Bluetooth connection. In this situation, table 815 may reflect the communication devices 820-850 that are currently paired with wearable device 810. Alternatively or additionally, the Bluetooth signal strength of each link may additionally be used as a filter to determine which of communication devices 820-850 are to be considered as potential candidates to be the active communication device. For example, only devices in which the received Bluetooth signal strength is above a threshold may be considered. Additionally, using the Bluetooth link, each of communication devices 820-850 may be authenticated by wearable device 810. Thus, table 815 may additionally only include devices that are authenticated.

Wearable device 810 may continuously monitor communication devices 820-850 to determine if the active communication device should be switched. For example, in one implementation, the highest priority device in table 815 (i.e., the highest priority communication device that is authenticated and within proximity to the user) may be made the active communication device. Alternatively or additionally, other user-chosen rules or policies may be used to select the active communication device.

In one implementation, the time of day may additionally be used as a factor in selecting the active communication device. For example, the user may specify that deskphone 850 is only to be the active device between the hours of 8 am and 6 pm. Alternatively or additionally, the location of wearable device 810 may be used as a factor in selecting the active communication device. For example, a user may indicate that when the user is near the user's home, one a particular set of priority values or a particular set of eligible communication devices is to be used. When the user is at or near the user's work location, another set of priority values or another set of eligible communication devices is to be used. When the user is in a vehicle, yet another set of priority values or set of eligible communication devices is to be used.

Figure 9:
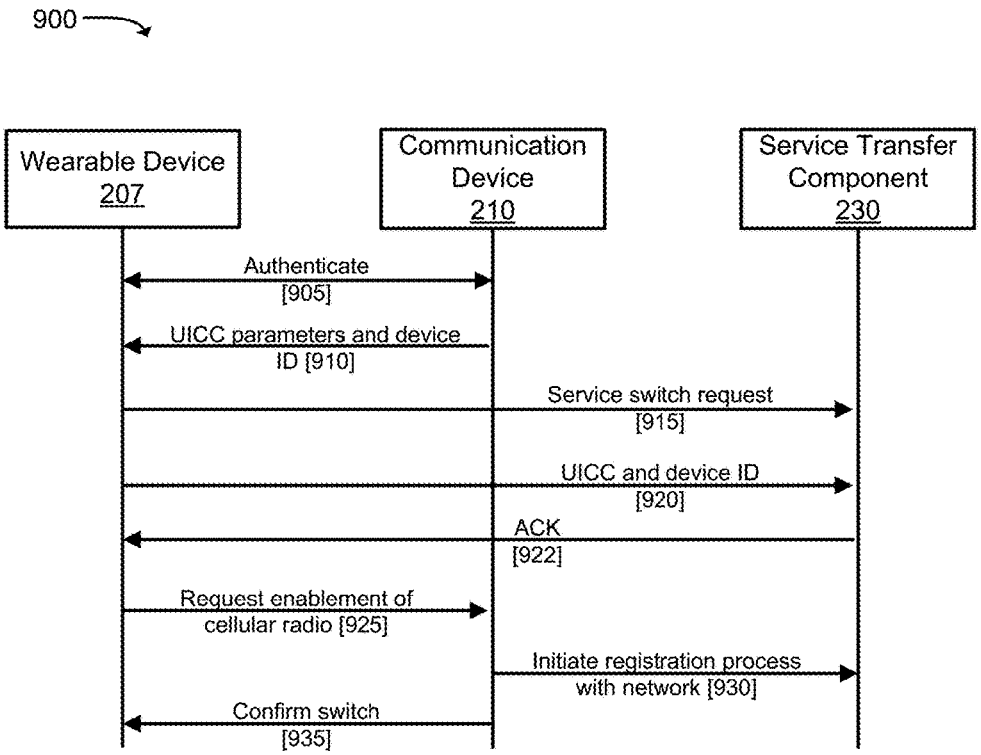
FIG. 9 is a diagram illustrating an example signal flow illustrating details of one possible implementation for the switch of network services from one endpoint to another.

FIG. 9 is a diagram illustrating an example signal flow 900 illustrating details of one possible implementation for the switch of network services from one endpoint to another. In the example of FIG. 9, communication device 210 represents the endpoint that is to receive the network services. Signal flow 900 may correspond to operations that are used to implement, for example, block 530, 650, or 730. In FIG. 9, the communications between wearable device 207 and communication device 210 may be transmitted using a short-range wireless link (e.g., Bluetooth), the communications between wearable device 207 and service transfer component 230 may be transmitted using the cellular link and/or a broadband link (e.g., using a Wi-Fi connection for wearable device 207), and the communications between communication device 210 and service transfer component 230 may be transmitted using the cellular link.

Wearable device 207 may authenticate communication device 210 (communication 905). The authentication may be performed, for example, using a public-private key pair. For instance, communication device 210 may sign a message using the private key of communication device 210 and send the message to wearable device 207, which may verify the message based on the known public key of communication device 210. Communication device 210 may subsequently transmit information relating to the communication device, such as UICC parameters and a device identifier of communication device 210 (communication 910).

Wearable device 207 may initiate the switch with the network, such as by contacting service transfer component 230 and requesting a service switch (communication 915). As part of the request or subsequent to the request, wearable device 207 may forward the UICC parameters and the device identifier to service transfer component 230 (communication 920). Service transfer component 230 may correspondingly communicate with other network devices, of communication network 220, to enable the server switch. Service transfer component 230 may acknowledge the (ACK) the service switch request (communication 922).

Wearable device 207 may request that communication device 210 enable its cellular radio (communication 925). Communication device 210 may thus connect to mobile communication network 220 and register with the network to implement the switch (communication 930). Communication device 210 may confirm, to wearable device 207, that the switch was performed (communication 935). Wearable device 207 may additionally release the previous active communication device, such as via a message transmitted over the short range wireless link. The previously active communication device may disconnect and/or go into a sleep mode with respect to mobile communication network 220.

Figure 10:
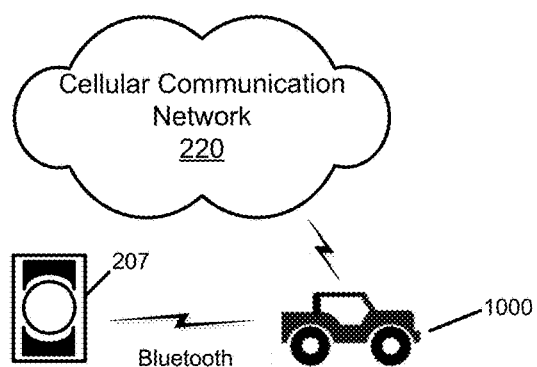
FIG. 10 is a diagram illustrating an example of one particular use case relating to switching of network services associated with a communication device of a vehicle.

FIG. 10 is a diagram illustrating an example of one particular use case relating to switching of network services associated with a communication device of a vehicle. As shown, assume that a user that possesses a wearable device 207 enters a vehicle 1000 that includes an embedded communication device, such as a communication device designed to provide cellular service via mobile communication network 220. When the user turns on vehicle 1000, wearable device 207 may pair with the embedded communication device using a Bluetooth link. Wearable device 207 may determine whether the user is in the vehicle, such as by making the determination based on the signal strength of the Bluetooth signal. When the user is determined to be in the vehicle, wearable device 207 may initiate the switch to providing network services via the embedded communication device. When the vehicle turns off or when the user exits the vehicle (e.g., based on a loss of connection of the Bluetooth link or a signal strength of the link falling below a threshold value), wearable device 207 may similarly initiate the switch to providing network services back to wearable device 207 or to another communication device of the user.

Figure 11:
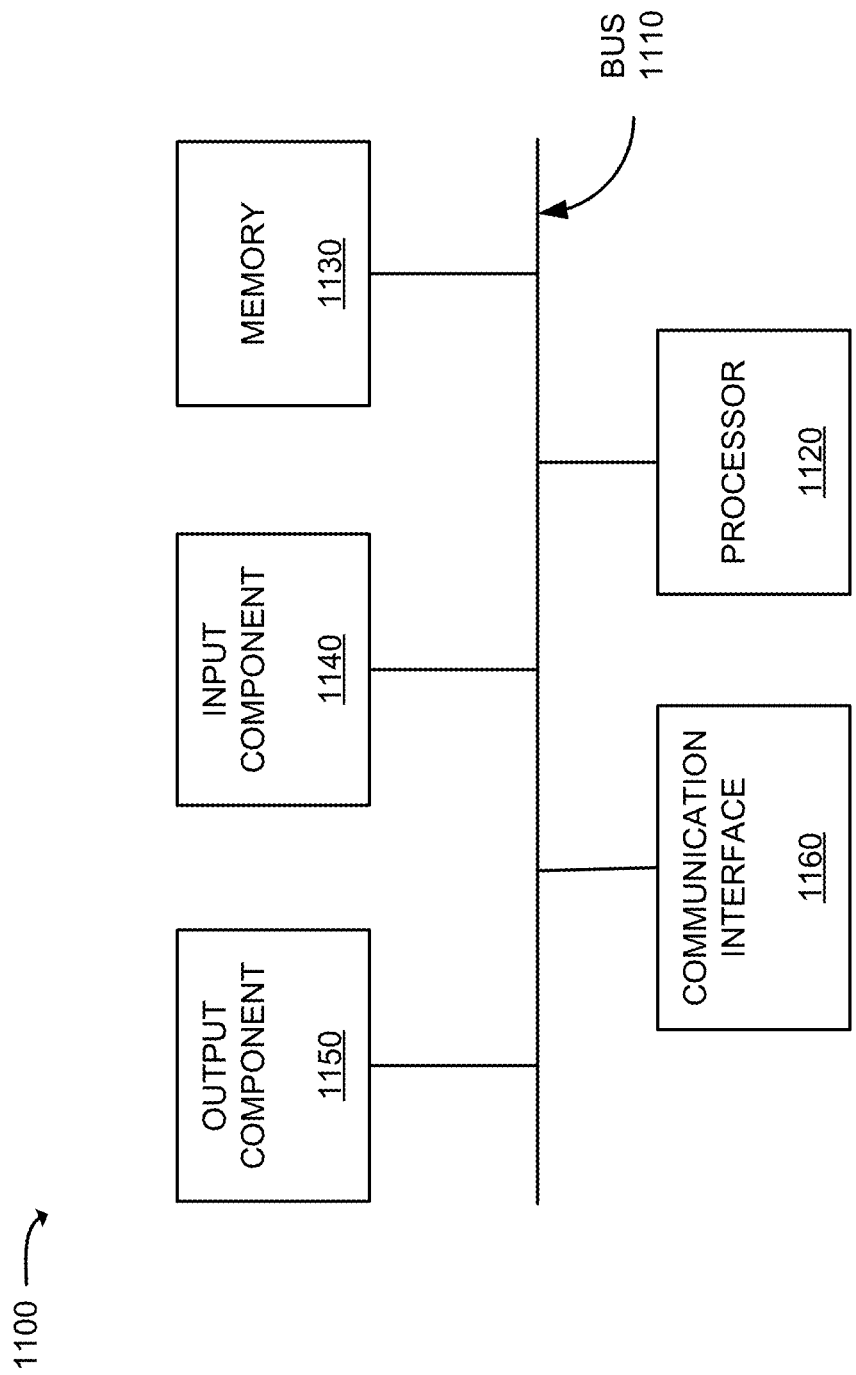
FIG. 11 is a diagram of example components of a device.

FIG. 11 is a diagram of example components of a device 1100. Each of the devices illustrated in FIGS. 1A, 1B, 2, 8 and 10 may include one or more devices 1100. Device 1100 may include bus 1110, processor 1120, memory 1130, input component 1140, output component 1150, and communication interface 1160. In another implementation, device 1100 may include additional, fewer, different, or differently arranged components. As described herein, a component may be implemented by hardware circuitry, software logic, and/or some combination thereof.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes (LEDs), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of blocks/acts have been described with regard to FIGS. 5-7, the order of the blocks/acts may be modified in other implementations. Further, non-dependent blocks may be performed in parallel. Similarly, while series of communications have been described with regard to several of the figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A wearable device comprising:
a computer-readable medium storing:
   a list of communication devices associated with a user, and
   user preference information; and
one or more processors to execute instructions to cause the one or more processors to:
   attempt to detect a presence of one or more communication devices, in the list, by using a short-range wireless communication technology,
   detect, based on the attempting, the presence of a set of communication devices that are within range of the wearable device in accordance with the short-range wireless communication technology,
   automatically select, based on the detected presence of the set of communication devices and based on the user preference information, a particular communication device, of the set of detected communication devices, that is to be used to handle subsequent network services associated with the user,
   receive, based on the automatic selection and from the selected particular communication device, a set of Universal Integrated Circuit Card (UICC) parameters associated with the particular communication device, and
   output, to one or more network devices associated with a mobile network and with the particular communication device, a request to switch the subsequent network services to the particular communication device, wherein the request includes the UICC parameters associated with the particular communication device,
      wherein providing the stored set of UICC parameters to the one or more network devices causes the routing of the network services for the user to be performed through the particular communication device, and
      wherein providing the stored set of UICC parameters to the one or more network devices further causes termination of the routing of network services to a previously active communication device in the list, such that any subsequent network service requests for the user will be received by the selected particular communication device and not received by the previously active communication device.

2. The wearable device of claim 1, wherein the routing of the network services includes routing at least voice or video calls.

3. The wearable device of claim 1, wherein the user preference information relates to selection priority of which of the communication devices in the list is to be an active communication device for the user.

4. The wearable device of claim 3, wherein the user preference information includes relative priorities among the communication devices in the list, and wherein the selection of the particular communication device includes executing the instructions by the one or more processors to:
   select the particular communication device, from the detected set of communication devices, which has a highest priority out of the communication devices in the detected set of communication devices.

5. The wearable device of claim 3, wherein the user preference information includes location information for the communication devices in the list, and wherein the selection of the particular communication device includes executing the instructions by the one or more processors to:

select the particular communication device, from the detected set of communication devices, when a current location of the wearable device is within a threshold distance of a location of the particular communication device, as indicated by the location information corresponding to the particular communication device.

6. The wearable device of claim 1, wherein executing the processor-executable instructions further causes the one or more processors to:
determine a signal strength associated with each communication device, in the detected set of communication devices,
wherein the selection of the particular communication device is performed when a determined signal strength, associated with the particular communication device, is above a threshold level.

7. The wearable device of claim 1, wherein the instructions further cause the one or more processors to:
determine, based on the presence information, when the particular communication device leaves a proximity of the user; and
based on the determination that the particular communication device has left the proximity of the user:
select another communication device, from the detected set of communication devices, to which the routing of network services is to be switched; and
communicate with the one or more network devices to cause the routing of the network services for the user to be performed through the another communication device.

8. The wearable device of claim 1, wherein the instructions further cause the one or more processors to:
receive, via an interface of the wearable device, an explicit indication from the user to select another communication device to which the routing of network services is to be switched; and
communicate with the one or more network devices to cause the routing of the network services for the user to be performed through the another communication device.

9. The wearable device of claim 1, wherein the instructions further cause the one or more processors to:
receive, based on a detected presence of another communication device via a Near Field Communication (NFC) link, an explicit indication from the user to select the another communication device to which the routing of network services is to be switched; and
communicate with the one or more network devices to cause the routing of the network services for the user to be performed through the another communication device.

10. The wearable device of claim 1, wherein the user preference information includes distance thresholds for the list of communication devices, the distance thresholds indicating maximum distances from wearable device which the communication devices will be selected.

11. A method comprising:
storing a list of communication devices associated with a user;
storing user preference information relating to selection of which of the communication devices in the list is to be an active communication device for the user;
attempting to detect a presence of one or more communication devices, in the list, by using a short-range wireless communication technology;
detecting, based on the attempting, the presence of a set of communication devices that are within range of the wearable device in accordance with the short-range wireless communication technology;
automatically selecting, based on the determined presence of the communication devices and based on the user preference information, a particular communication device, of the set of detected communication devices, that is to be used to handle subsequent network services associated with the user;
receiving, based on the automatic selection and from the selected particular communication device, a set of Universal Integrated Circuit Card (UICC) parameters associated with the particular communication device; and
outputting, to one or more network devices associated with a mobile network and with the particular communication device, a request to switch the subsequent network services to the particular communication device, wherein the request includes the UICC parameters associated with the particular communication device,
wherein providing the stored set of UICC parameters to the one or more network devices causes the routing of the network services for the user to be performed through the particular communication device, and
wherein providing the stored set of UICC parameters to the one or more network devices further causes termination of the routing of network services to a previously active communication device in the list, such that any subsequent network service requests for the user will be received by the particular communication device and not received by the previously active communication device.

12. The method of claim 11, wherein the user preference information includes relative priorities among the communication devices in the list, and wherein the selection of the particular communication device additionally includes:
selecting the particular communication device, from the detected set of communication devices, which has a highest priority out of the communication devices in the set of communication devices.

13. The method of claim 11, wherein the user preference information includes location information for the communication devices in the list, and wherein the selection of the particular communication device additionally includes:
selecting the particular communication device, from the detected set of communication devices, when a current location of the wearable device is within a threshold distance of a location of the particular communication device, as indicated by the location information corresponding to the particular communication device.

14. The method of claim 11, further comprising:
determining a signal strength associated with each communication device, in the detected set of communication devices,
wherein the selection of the particular communication device is performed when a determined signal strength, associated with the particular communication device, is above a threshold level.

15. The method of claim 11, further comprising:
determining, based on the presence information, when the particular communication device leaves a proximity of the user; and
based on the determination that the particular communication device has left the proximity of the user:
selecting another communication device, from the detected set of communication devices, to which the routing of network services is to be switched; and communicating with the one or more network devices to cause the routing of the network services for the user to be performed through the another communication device.

16. The method of claim 11, further comprising:
receiving, based on a detected presence of another communication device via a Near Field Communication (NFC) link, an explicit indication from the user to select the another communication device to which the routing of network services is to be switched; and
communicating with the one or more network devices to cause the routing of the network services for the user to be performed through the another communication device.

17. A non-transitory computer readable medium containing program instructions for causing one or more processors to:
maintain a list of communication devices associated with a user;
maintain user preference information relating to selection of which of the communication devices in the list is to be an active communication device for the user;
attempt to detect a presence of one or more communication devices, in the list, by using a short-range wireless communication technology,
detect, based on the attempting, the presence of a set of communication devices that are within range of the wearable device in accordance with the short-range wireless communication technology,
automatically select, based on the detected presence of the set of communication devices and based on the user preference information, a particular communication device, of the set of detected communication devices, to which the routing of network services is to be switched;
receive, based on the automatic selection and from the selected particular communication device, a set of Universal Integrated Circuit Card (UICC) parameters associated with the particular communication device; and
output, to one or more network devices associated with a mobile network and with the particular communication device, a request to switch subsequent network services to the particular communication device, wherein the request includes the UICC parameters associated with the particular communication device,
wherein providing the stored set of UICC parameters to the one or more network devices causes the routing of the network services for the user to be performed through the particular communication device, and
wherein providing the stored set of UICC parameters to the one or more network devices further causes to the one or more network devices further causes termination of the routing of network services to a previously active communication device in the list, such that any subsequent network service requests for the user will be received by the particular communication device and not received by the previously active communication device.

18. The non-transitory computer readable medium of claim 17, wherein the user preference information includes relative priorities among the communication devices in the list, and wherein the program instructions are to further cause the one or more processors to:
select the particular communication device, from the detected set of communication devices, which has a highest priority out of the communication devices in the detected set of communication devices.

19. The non-transitory computer readable medium of claim 17, wherein the user preference information includes location information for the communication devices in the list, and wherein the program instructions are to further cause the one or more processors to:
select the particular communication device, from the detected set of communication devices, when a current location of the wearable device is within a threshold distance of a location of the particular communication device, as indicated by the location information corresponding to the particular communication device.

20. The non-transitory computer readable medium of claim 17, wherein executing the processor-executable instructions further causes the one or more processors to:
determine a signal strength associated with each communication device, in the detected set of communication devices,
wherein the selection of the particular communication device is performed when a signal strength associated with the short-range wireless link to the particular communication device is above a threshold level.

* * * * *